United States Patent
Kogure

(10) Patent No.: US 12,437,019 B2
(45) Date of Patent: Oct. 7, 2025

(54) WEB BROWSING SYSTEM, COMMUNICATION TERMINAL, IMAGE GENERATION SERVER

(71) Applicant: CANON KABUSHIKI KAISHA, Tokyo (JP)

(72) Inventor: Takeshi Kogure, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/366,547

(22) Filed: Aug. 7, 2023

(65) Prior Publication Data

US 2024/0045915 A1 Feb. 8, 2024

(30) Foreign Application Priority Data

Aug. 8, 2022 (JP) .................... 2022-126366

(51) Int. Cl.
| | |
|---|---|
| *G06F 15/16* | (2006.01) |
| *G06F 16/954* | (2019.01) |
| *G06F 16/957* | (2019.01) |
| *H04L 67/02* | (2022.01) |
| *H04L 67/56* | (2022.01) |

(52) U.S. Cl.
CPC ........ *G06F 16/954* (2019.01); *G06F 16/9577* (2019.01); *H04L 67/02* (2013.01); *H04L 67/56* (2022.05)

(58) Field of Classification Search
CPC ... G06F 16/954; G06F 16/9577; H04L 67/56; H04L 67/02
USPC ........................................ 709/203
See application file for complete search history.

(56) References Cited

U.S. PATENT DOCUMENTS

| 11,258,872 B1* | 2/2022 | Gogel | H04L 67/02 |
| 2005/0044242 A1* | 2/2005 | Stevens | H04L 67/2876 |
| | | | 709/228 |
| 2011/0197264 A1* | 8/2011 | McDade | G06F 21/10 |
| | | | 709/219 |
| 2012/0194519 A1* | 8/2012 | Bissell | G06F 16/9577 |
| | | | 345/428 |
| 2013/0107311 A1* | 5/2013 | Eng | G06F 3/1268 |
| | | | 358/1.15 |
| 2013/0212462 A1* | 8/2013 | Athas | G06F 16/9577 |
| | | | 715/234 |
| 2021/0034719 A1* | 2/2021 | Brown | G06F 21/14 |
| 2022/0066810 A1 | 3/2022 | Ikeda | |
| 2022/0174129 A1* | 6/2022 | Penz | H04L 45/66 |

FOREIGN PATENT DOCUMENTS

JP 2022041717 A 3/2022

* cited by examiner

*Primary Examiner* — Alan S Chou
(74) *Attorney, Agent, or Firm* — Canon U.S.A., Inc. IP Division

(57) ABSTRACT

A cloud browser system including an image generation server and a Web browsing system including an image forming apparatus and another image forming apparatus includes a unit that creates a tunnel between each of the image forming apparatuses and the image generation server so that the image generation server performs communication via virtual proxies provided by the respective image forming apparatuses and a unit that downloads Web content from a Web server via each tunnel and provides a rendering result based on the Web content to the corresponding image forming apparatus.

7 Claims, 15 Drawing Sheets

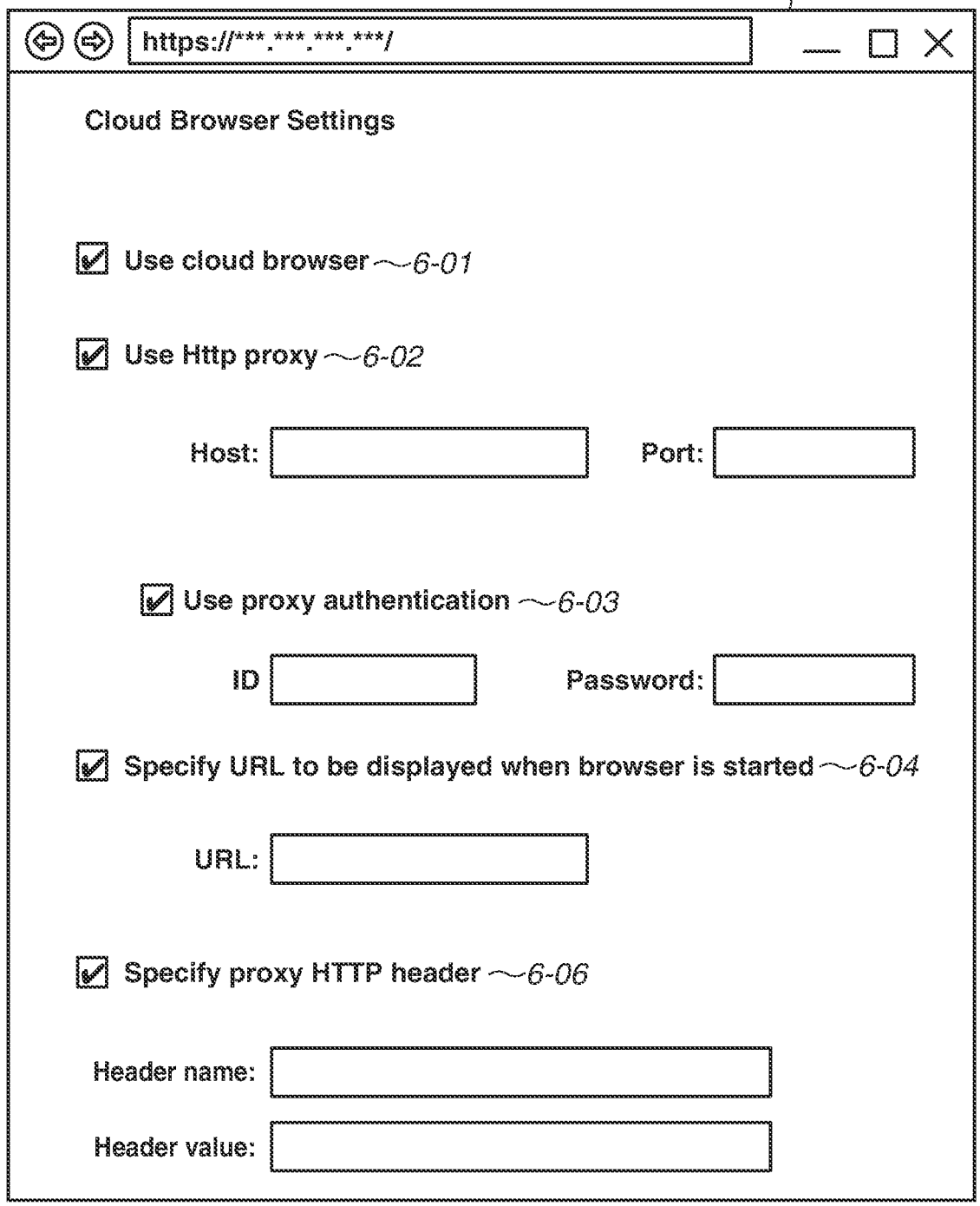

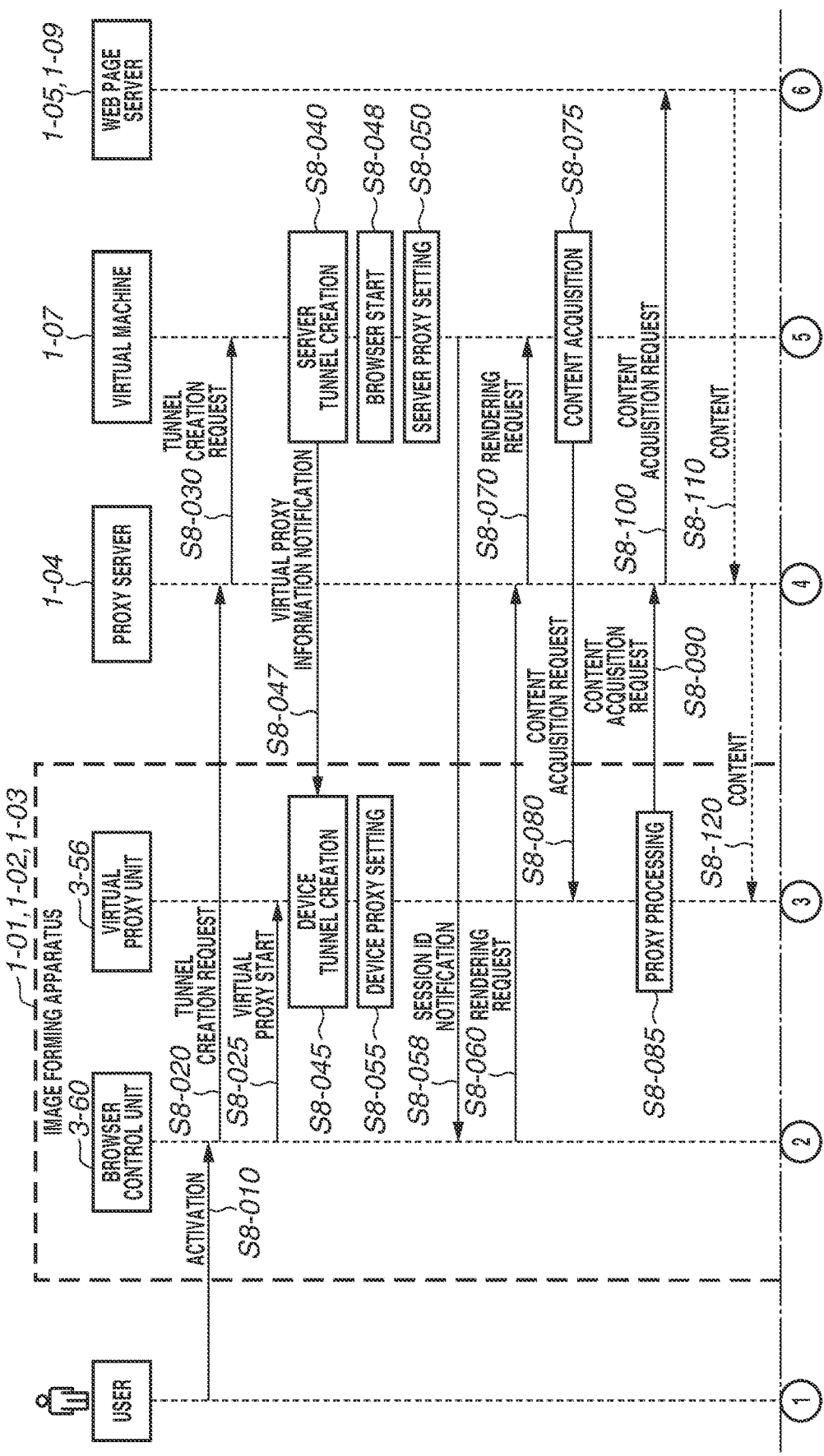

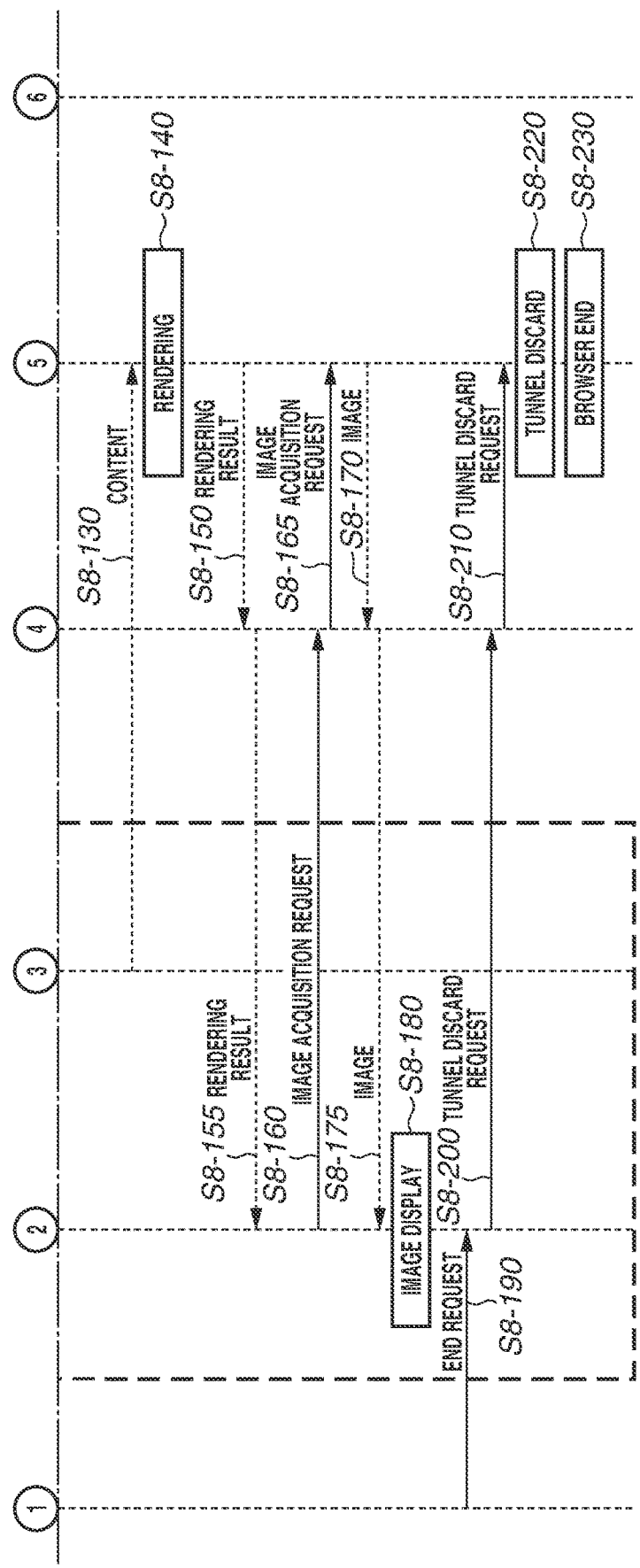

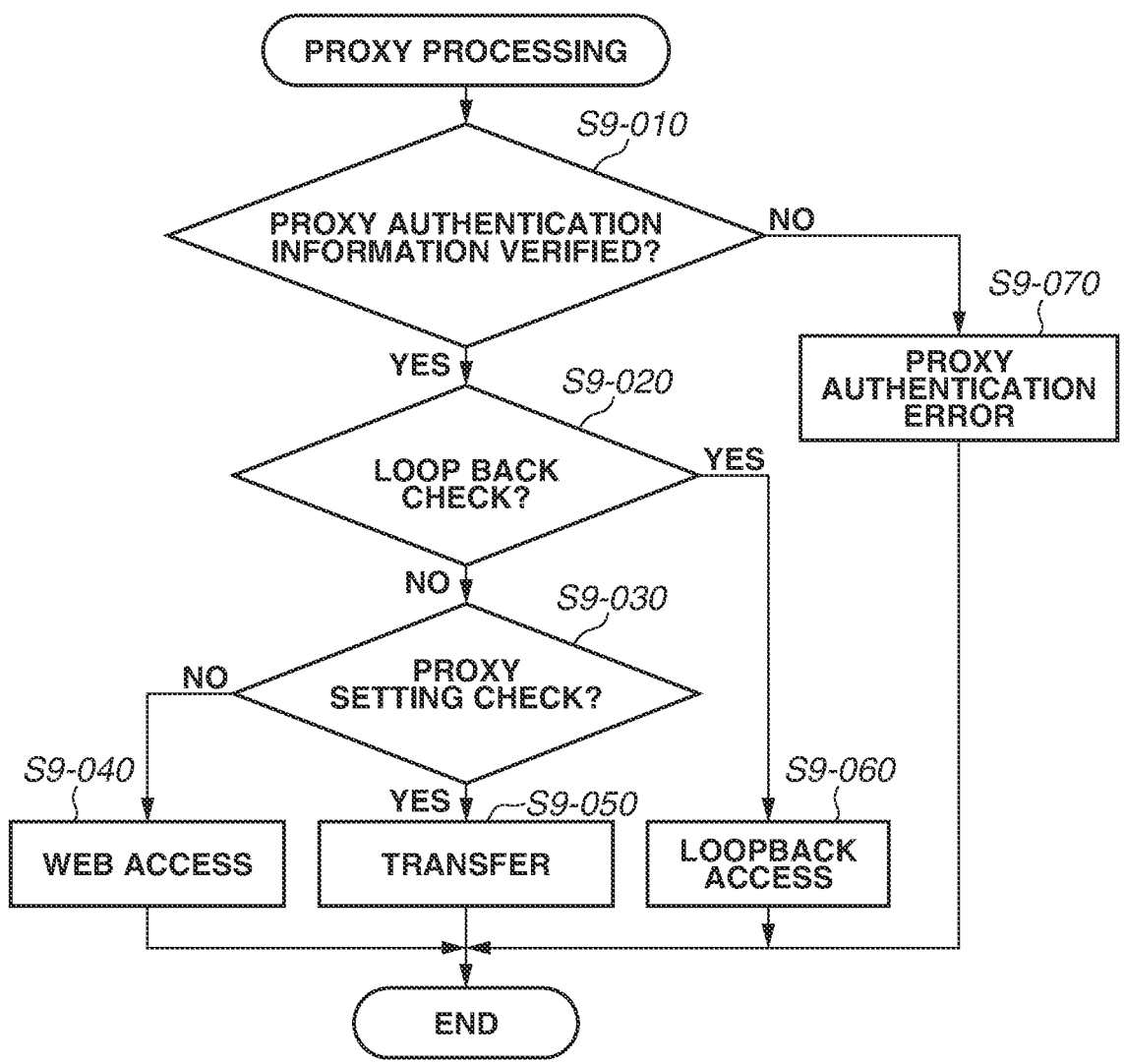

FIG.13A

| SESSION | PROXY HOST | PROXY PORT | PROXY AUTHENTICATION ID | PROXY AUTHENTICATION PASSWORD |
|---|---|---|---|---|
| 1 | localhost | 10000 | fjioajeioap | jfeiowpji32 |
| 2 | localhost | 10001 | jfieou2903 | 90j42ifkjaij |
| 3 | localhost | 10002 | 3280jfia0ji | j3i20jfiaojio |

| SESSION | BROWSER |
|---|---|
| 1 | BROWSER 1 |
| 2 | BROWSER 2 |
| 3 | BROWSER 3 |

*13-70  13-71*

WEB BROWSING SYSTEM, COMMUNICATION TERMINAL, IMAGE GENERATION SERVER

BACKGROUND

Field

The present disclosure relates to a communication terminal used in a Web browsing system. The communication terminal can be applied to a general-purpose information processing apparatus, such as a personal computer or a mobile terminal, in addition to an image processing apparatus, such as a printer, a scanner, a FAX, or a multifunction peripheral thereof.

Description of the Related Art

It is known that image processing apparatuses (information processing apparatuses) can operate as communication terminals. These communication terminals can include a Web browser (hereinafter, referred to as "browser") that includes a function of browsing Web pages on the Web browser. The communication terminal can access a Web page of an external service via the Web browser and expand its functions by cooperating with the external service. To try and ensure security in a specific environment when using a Web browser, restricting access, recording access histories, and other techniques via a proxy are used.

A system can include a cloud browser using an image generation server that generates drawing results of Web pages on a cloud server. Japanese Patent Application Laid-Open No. 2022-41717 discusses a system in which a Web page is rendered in a virtual machine on a network different from a communication terminal, and the rendering result is displayed on the communication terminal. In such a system, processing with a high calculation load, such as analysis processing and execution processing of a Web page, is performed on a server, enabling the required specifications of the communication terminal to be reduced.

SUMMARY

According to an aspect of the present disclosure, a Web browsing system including an image generation server that renders Web content and a first communication terminal and a second communication terminal that communicate with the image generation server and display the Web content based on a result of the rendering includes a unit configured to establish a first communication path between the first communication terminal and the image generation server so that the image generation server performs communication via a virtual proxy provided by the first communication terminal, a unit configured to establish a second communication path between the second communication terminal and the image generation server so that the image generation server performs communication via a virtual proxy provided by the second communication terminal, a unit configured to download Web content from a Web server via the first communication path in the image generation server and provide a rendering result based on the Web content downloaded via the first communication path to the first communication terminal, and a unit configured to download Web content from a Web server via the second communication path in the image generation server and provide a rendering result based on the Web content downloaded via the second communication path to the second communication terminal.

Further features will become apparent from the following description of exemplary embodiments with reference to the attached drawings.

BRIEF DESCRIPTION OF THE DRAWINGS

FIG. 6 illustrates a settings screen of a cloud browser.

FIGS. 8A and 8B illustrate a use sequence of the cloud browser system.

FIG. 9 is a flowchart illustrating proxy processing of the image forming apparatus.

FIG. 13A illustrates an example of virtual proxy information managed by the virtual machine. FIG. 13B illustrates an example of association management information between a session and a browser managed by the virtual machine.

DESCRIPTION OF THE EMBODIMENTS

Hereinafter, exemplary embodiments of the present disclosure will be described in detail with reference to the accompanying drawings. The scope of the present disclosure is not limited to the configurations described in the exemplary embodiments. Within a range where the same effect is obtained, a part of the configuration or a part of the processing can be modified by being replaced with an equivalent or omitted.

<Cloud Browser System>

Figure 1:
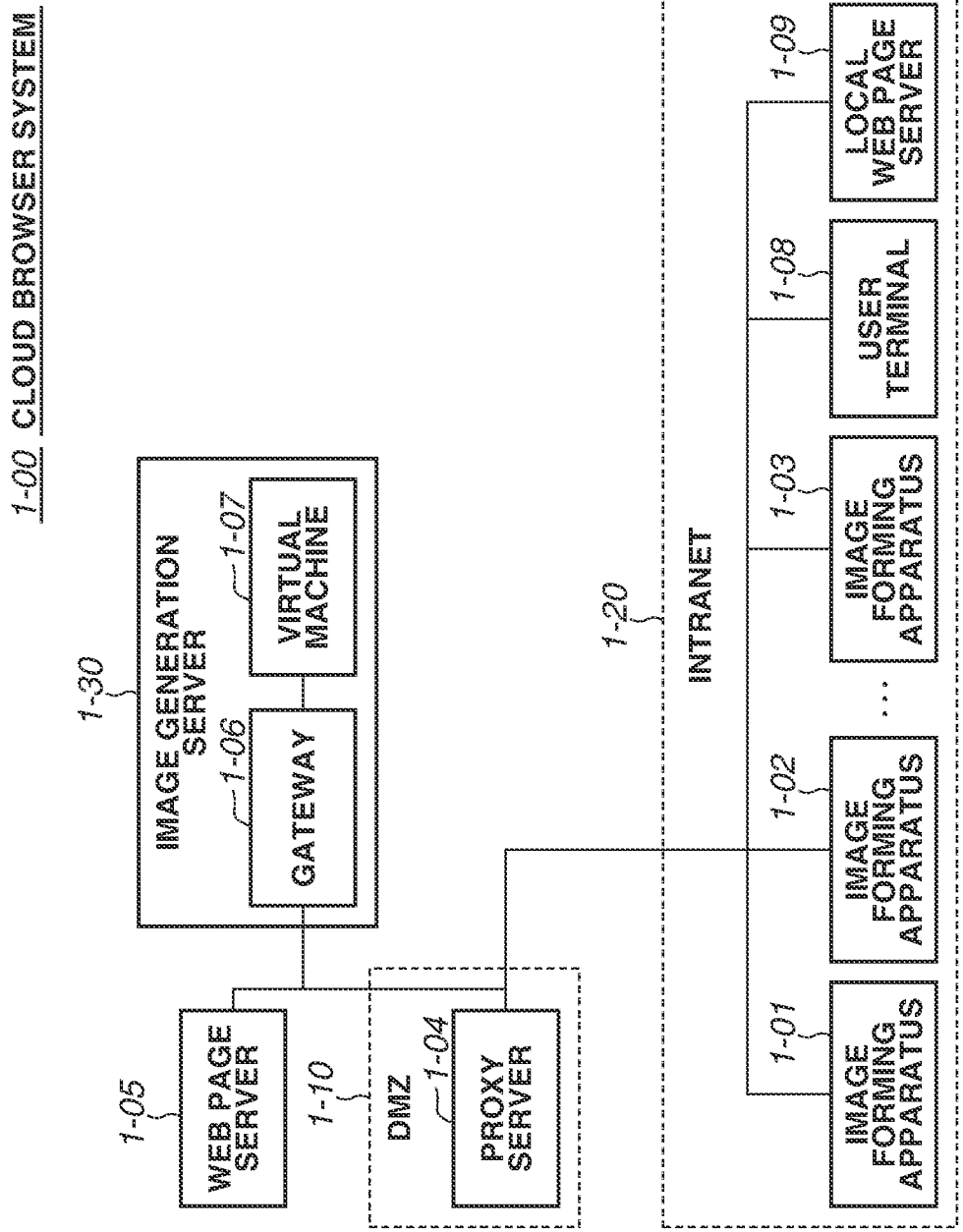
FIG. 1 is a block diagram illustrating the overall configuration of a cloud browser system.

A first exemplary embodiment will now be described. FIG. 1 illustrates the overall configuration of a cloud browser system 1-00. The cloud browser system 1-00 is a Web browsing system that performs rendering of Web content in the cloud. The cloud browser system 1-00 includes a plurality of image forming apparatuses 1-01 to 1-03 and an image generation server 1-30 to which these image forming apparatuses are connected.

In addition, the cloud browser system 1-00 includes a Web page server 1-05 and a local Web page server 1-09 that provide Web pages, and a proxy server 1-04. FIG. 1 illustrates an example in which the image generation server 1-30 as one unit is connected to the three image forming apparatuses 1-01 to 1-03. However, the number of image forming apparatuses connected to the image generation server 1-30 may be any number. The image generation server 1-30 is configured to provide services to a plurality of image forming apparatuses in parallel or in a time-division manner. Thus, in the cloud browser system 1-00, the number of the image generation servers 1-30 is relatively smaller than the number of the image forming apparatuses. Further, for example, a plurality of image generation servers may be arranged in the cloud browser system 1-00 for the purpose of distributing a load. Hereinafter, a relationship with the image generation server 1-30 will be described using the image forming apparatus 1-01 as a representative of the plurality of image forming apparatuses.

The image generation server 1-30 is a cloud system that provides a service as a substitute for Web content rendering. The image generation server 1-30 includes a gateway 1-06 and a virtual machine 1-07. As will be described in detail below, a browser engine, which is a software module, operates on the virtual machine 1-07 of the image generation server 1-30. The browser engine receives a Uniform Resource Locator (URL) transmitted from the image forming apparatus 1-01 via the gateway 1-06. Then, the browser engine accesses the Web page corresponding to the received URL via the gateway 1-06, and receives, for example, Hyper Text Markup Language (HTML) Web content from the Web page. Thereafter, a rendering result (rendering image) of the received Web content is generated by a separately prepared software module that performs rendering. The rendering result is transmitted to the image forming apparatus 1-01 via the gateway 1-06.

The image forming apparatus 1-01 is an image processing apparatus (information processing apparatus, or communication terminal) having a function of forming (printing) an image on a sheet (paper), a function of transmitting image data generated by scanning to an arbitrary destination, or another function. The image forming apparatus 1-01 may be either a multi-function peripheral (MFP) or a single-function printer (SFP). A printing method for the image forming apparatus 1-01 may be either an electrophotographic method or an inkjet method. The image forming apparatus 1-01 according to the present exemplary embodiment is characterized by browsing and displaying Web content on the Internet by using the image generation server 1-30. Details will be described below.

The image forming apparatus 1-01 exists in an intranet 1-20, and can communicate with other apparatuses in the same intranet. For example, the image forming apparatus 1-01 can access Web pages provided by a local Web page server. Further, the image forming apparatus 1-01 can provide Web pages to a user terminal 1-08 by functioning as a Web server.

The proxy server 1-04 is a server that monitors and restricts communications between the inside and outside of the intranet 1-20. The proxy server 1-04 performs URL filtering (Web filtering) to restrict access to a Web site. This access restriction is performed using a list of Web sites to which access is prohibited or a list of Web sites to which access is permitted. Each apparatus in the intranet 1-20 is connected to the Internet via/not via the proxy server 1-04 depending on a setting held by each apparatus. For example, in FIG. 1, in a case where a user operates the image forming apparatus 1-01 to input a browsing request to browse the Web page server 1-05, the image forming apparatus 1-01 transmits the address (hereinafter referred to as URL) of the Web page server 1-05 to the image generation server 1-30 via the proxy server 1-04. Further, the proxy server 1-04 is set in a demilitarized zone (DMZ) 1-10. The DMZ 1-10 is a segment isolated from the intranet 1-20 for enhanced security.

<Virtual Machine>

Figure 2A:
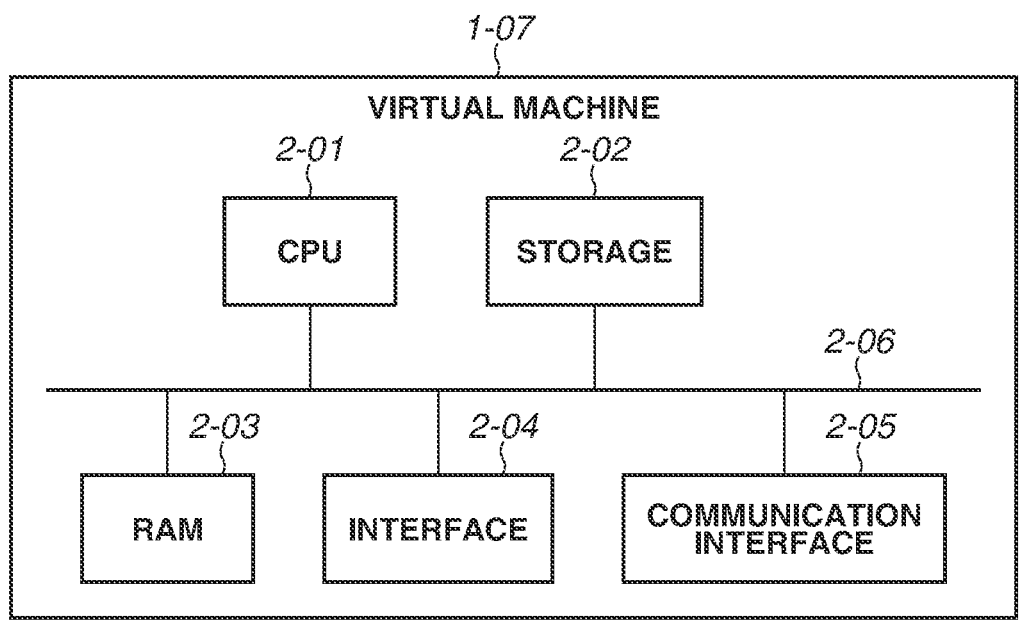
FIG. 2A is a block diagram illustrating a hardware configuration of a virtual machine.

FIG. 2A is a block diagram illustrating a hardware configuration of the virtual machine 1-07.

The virtual machine 1-07 includes a central processing unit (CPU) 2-01, a storage 2-02, a random-access memory (RAM) 2-03, an interface 2-04, and a communication interface 2-05. These components are communicably connected to each other via a bus 2-06.

The CPU 2-01 performs various types of processing using computer programs and data stored in the storage 2-02. Thus, the CPU 2-01 performs the general operation controls of the virtual machine 1-07, and performs or controls pieces of processing to be described below as pieces of processing to be performed by the virtual machine 1-07.

The storage 2-02 stores, for example, setting data about the virtual machine 1-07, computer programs and data involved in activation of the virtual machine 1-07, and computer programs and data involved in basic operations of the virtual machine 1-07. The RAM 2-03 has an area for storing computer programs loaded from the storage 2-02 and data received from an external apparatus via the communication interface 2-05. The RAM 2-03 has a work area used when the CPU 2-01 performs various kinds of processing. Thus, the RAM 2-03 can appropriately provide various areas (storage areas).

The interface 2-04 is an interface including, for example, a display unit for displaying a processing result by the CPU 2-01 with an image, characters, or the like, and an operation unit operated by the user to perform various operation inputs. The display unit includes a liquid crystal screen or a touch panel screen. The operation unit includes a keyboard, a mouse, and a user interface, such as a touch panel screen.

The communication interface 2-05 is an interface for data communication with the external apparatus.

The configuration illustrated in FIG. 2A is merely an example of a configuration applicable to the virtual machine 1-07, and the configuration applicable to the virtual machine 1-07 is not intended to be limited to the configuration illustrated in FIG. 2A. For example, in the configuration illustrated in FIG. 2A, an additional memory device may be further connected to the bus 2-06. Examples of the additional memory device includes a hard disk drive (HDD), a Universal Serial Bus (USB) memory, a magnetic card, an optical card, an integrated circuit (IC) card, a memory card, and a drive device (for example, a drive device of a storage medium as an optical disk, such as a flexible disk (FD) or a Compact Disk (CD)). The virtual machine 1-07 can be configured by a so-called virtualization technique, and various resources constituting a computer system can be organized into a logical unit independently of its physical configuration. In other words, a plurality of resources may be integrated to configure the virtual machine 1-07, or through division of one resource into pieces, one piece may be configured as the virtual machine 1-07. Thus, the virtual machine 1-07 can be configured using at least a part of a plurality of resources (which can be configured of a plurality of devices) of an information processing system constituting a cloud.

Figure 2B:
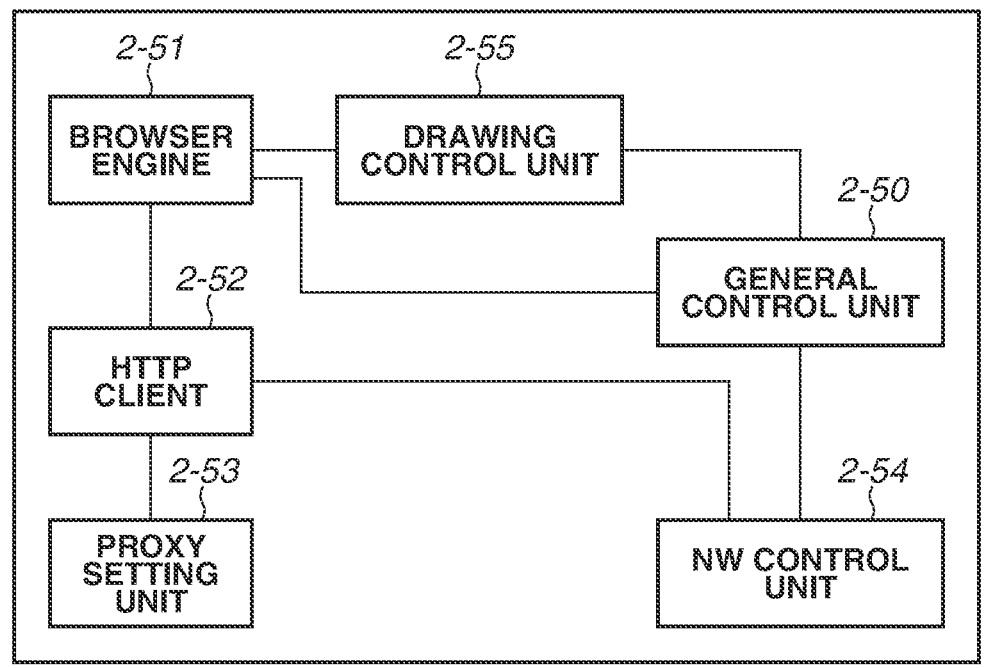
FIG. 2B is a block diagram illustrating a software configuration of the virtual machine.

FIG. 2B illustrates a software configuration of the virtual machine 1-07 operating in the cloud browser system 1-00. A general control unit 2-50 is a module that generally controls the virtual machine 1-07 of the cloud browser system 1-00. A network (NW) control unit 2-54 is a module that performs reception of communications from the outside, transmission of data, and other operations through the communication interface 2-05. The NW control unit 2-54 receives a rendering request for the Web content specified by a URL, and notifies the general control unit 2-50 of the rendering request. Rendering refers to generating an image or the like from abstract and high-level information described in a data description language or a data structure. The general control unit 2-50 receives the rendering request notification, and notifies a browser engine 2-51 of the specified URL. The browser engine 2-51 passes the URL to a HyperText Transfer Protocol (HTTP) client 2-52 in order to acquire the Web content indicated by the URL. The HTTP client 2-52 acquires proxy information set in a proxy setting unit 2-53, and requests the NW control unit 2-54 to acquire the Web content of the specified URL via the proxy.

The NW control unit 2-54 accesses the URL via the specified proxy and acquires the Web content. The browser engine 2-51 requests a drawing control unit 2-55 to draw the acquired information on the Web content. The general control unit 2-50 transmits the image data drawn by the drawing control unit 2-55 to the external apparatus through the NW control unit 2-54. A virtual proxy unit 3-56 (virtual proxy unit) functions as a proxy that provides a communication environment via the image forming apparatus 1-01 to the virtual machine 1-07. When the virtual proxy unit 3-56 functions, the virtual machine 1-07 accesses the Internet via the proxy server 1-04, and acquires Web content from the Web page server 1-05, for example. When the virtual proxy unit 3-56 functions, the virtual machine 1-07 accesses the intranet 1-20 and acquires Web content from, for example, the local Web page server 1-09.

<Image Forming Apparatus>

Figure 3A:
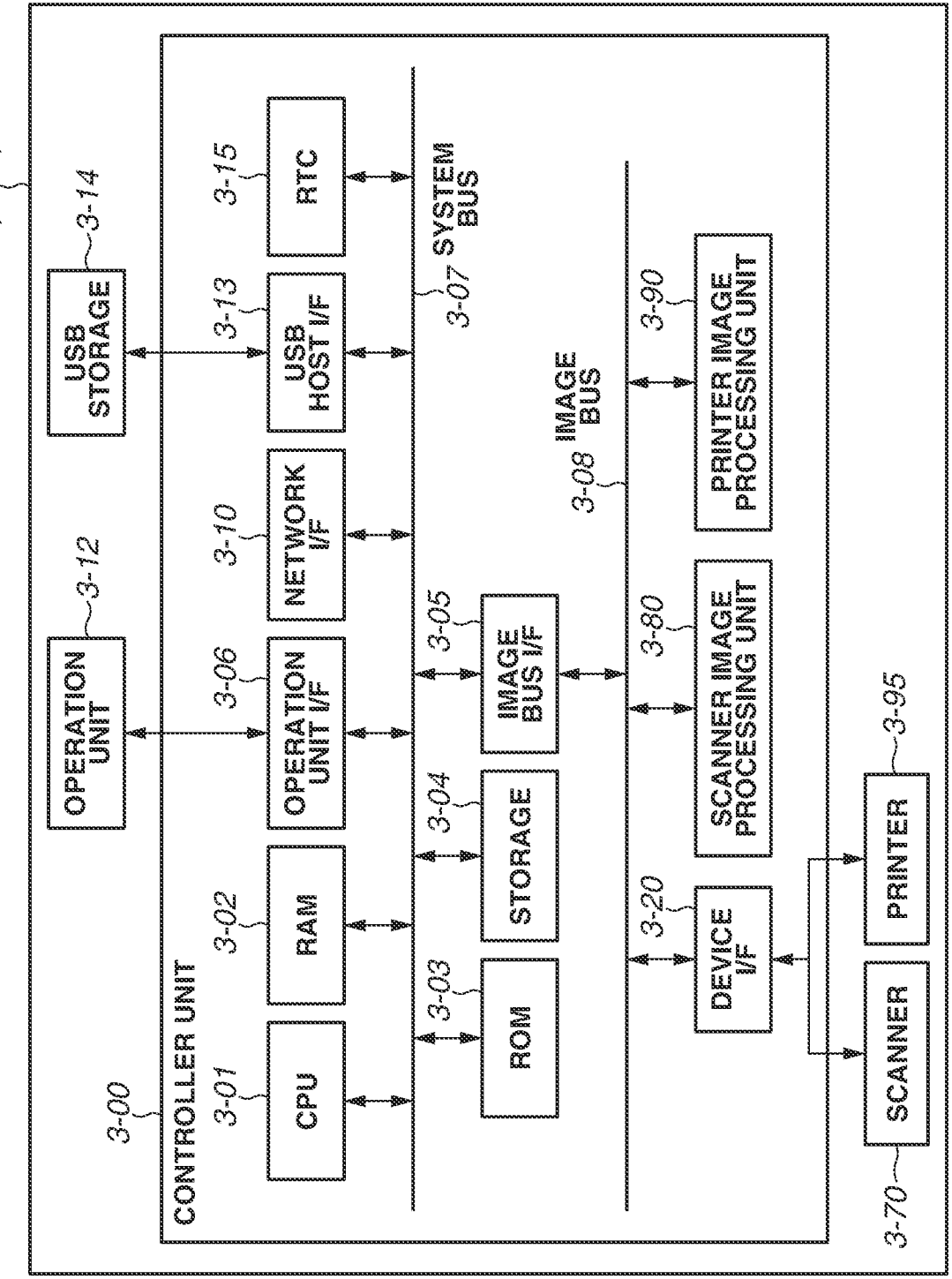
FIG. 3A is a block diagram illustrating a hardware configuration of an image forming apparatus.

FIG. 3A illustrates the hardware configuration of an image forming apparatus. The image forming apparatus 1-01 includes a controller unit 3-00, an operation unit 3-12, a USB storage 3-14, a scanner 3-70, and a printer 3-95.

The operation unit 3-12 is an operation unit that displays information to a user and receives an input from the user.

The operation unit 3-12 includes, for example, a display, a touch panel sensor, and hard keys.

The USB storage 3-14 is an external storage device that stores data. The USB storage 3-14 is attachable to and detachable from a USB host interface (UF) 3-13.

The scanner 3-70 is an image reading unit (image reading device, or image input device) that reads images from documents.

The printer 3-95 is an image forming unit (image forming device, or image output device) that forms images on sheets (paper).

The controller unit 3-00 is a control unit including a configuration for performing various kinds of control in the image forming apparatus 1-01. For example, the controller unit 3-00 performs control to implement a copy function of causing the printer 3-95 to print out image data read by the scanner 3-70.

The controller unit 3-00 includes a CPU 3-01, a RAM 3-02, a ROM 3-03, a storage 3-04, and an image bus OF 3-05. These components are communicably connected to each other via a system bus 3-07.

The controller unit 3-00 further includes an operation unit OF 3-06, a network OF 3-10, the USB host OF 3-13, a real time clock (RTC) 3-15, a device OF 3-20, a scanner image processing unit 3-80, and a printer image processing unit 3-90. These components and the image bus OF 3-05 are communicably connected via an image bus 3-08.

The CPU 3-01 boots an operating system (OS) with a boot program stored in the ROM 3-03. The CPU 3-01 runs programs stored in the storage 3-04 on the OS, thereby performing various kinds of processing. The RAM 3-02 is used as a work area of the CPU 3-01. The RAM 3-02 provides a work area and an image memory area for temporarily storing image data.

The storage 3-04 is a storage unit that stores programs and image data. The storage 3-04 may be an HDD, a solid state drive (SSD), or an embedded MultiMedia Card (eMMC).

The CPU 3-01 is connected via the system bus 3-07 to the ROM 3-03, the RAM 3-02, the operation unit I/F 3-06, the network I/F 3-10, the USB host I/F 3-13, and the image bus I/F 3-05. The operation unit I/F 3-06 is an interface with the operation unit 3-12, and outputs image data to be displayed on the operation unit 3-12 to the operation unit 3-12. The operation unit I/F 3-06 transmits information input to the operation unit 3-12 by the user to the CPU 3-01. The network I/F 3-10 is an interface connecting the image forming apparatuses 1-01 to 1-03 to a local area network (LAN).

The USB host I/F 3-13 is an interface unit that communicates with the USB storage 3-14. The USB host I/F 3-13 is an outputting unit that stores data stored in the storage 3-04 in the USB storage 3-14. Further, the USB host I/F 3-13 receives data stored in the USB storage 3-14, and transmits the data to the CPU 3-01. A plurality of USB devices including the USB storage 3-14 can be connected to the USB host I/F 3-13.

The RTC 3-15 controls current time. Time information controlled by the RTC 3-15 is used for recording a job input time.

The image bus I/F 3-05 is a bus bridge connecting the system bus 3-07 to the image bus 3-08 for high-speed image data transmission. On the image bus 3-08, the device I/F 3-20, the scanner image processing unit 3-80, and the printer image processing unit 3-90 are disposed. The scanner 3-70 and the printer 3-95 are connected to the device I/F 3-20, and the device I/F 3-20 performs synchronous/asynchronous conversion. The scanner image processing unit 3-80 corrects, processes, and edits input image data. The printer image processing unit 3-90 performs correction, resolution conversion, and other kinds of operation on print output image data in accordance with the printer 3-95.

Figure 3B:
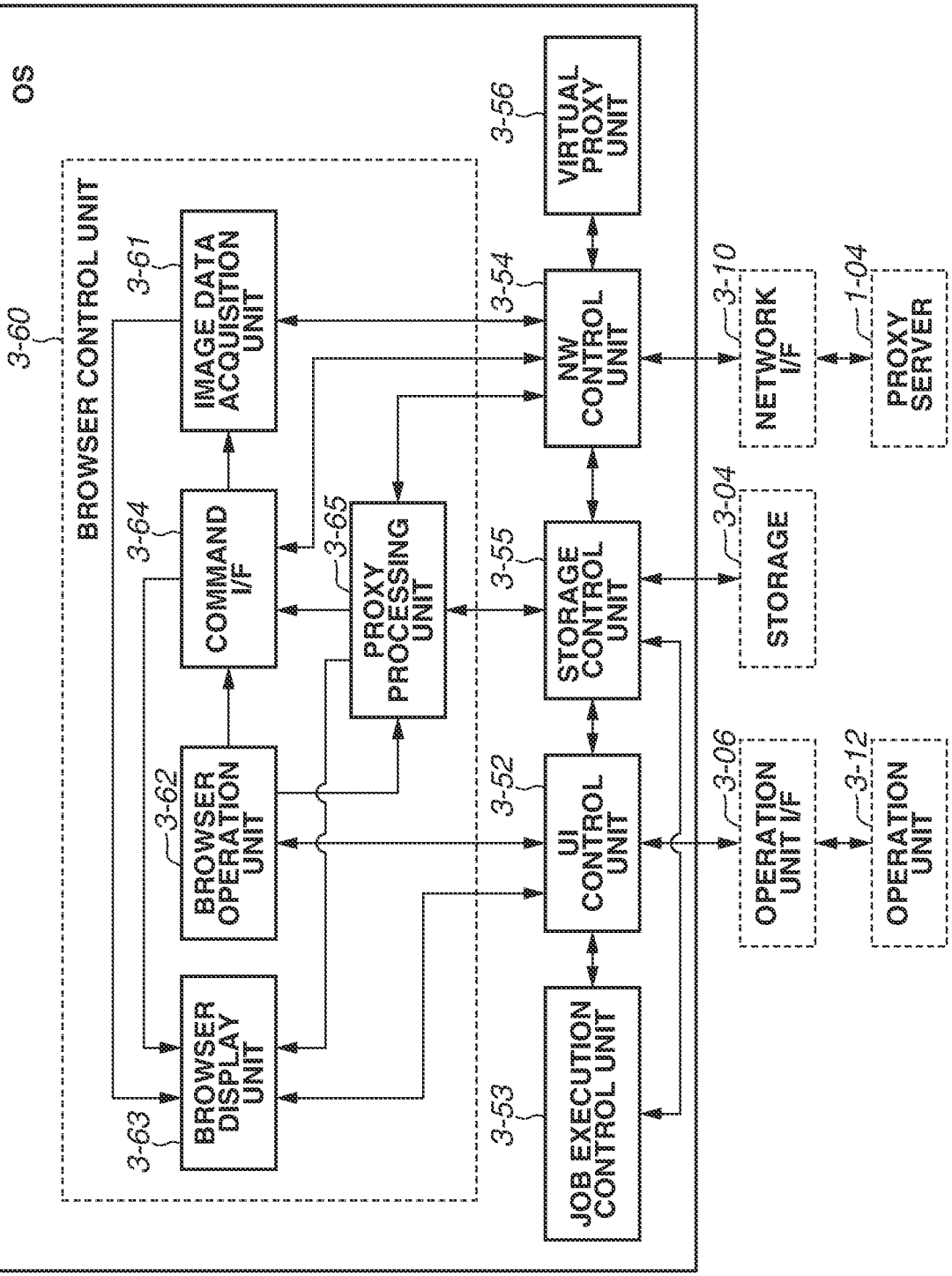
FIG. 3B is a block diagram illustrating a software configuration of the image forming apparatus.

FIG. 3B illustrates a software configuration of the image forming apparatus 1-01.

Each unit indicated by a solid line in FIG. 3B is a software module implemented by the CPU 3-01 running a main program loaded in the RAM 3-02.

In the main program, execution of each module described below is managed and controlled by an OS 3-51.

A user interface (UI) control unit 3-52 displays a screen on the operation unit 3-12, and accepts operations from the user via the operation unit I/F 3-06. The UI control unit 3-52 also has a function of sending a notification to another module and receiving a drawing instruction from the module to control screen update.

A job execution control unit 3-53 is a module that receives a job execution instruction from the UI control unit 3-52 and controls job processing, such as copying, scanning, and printing.

A NW control unit 3-54 receives a communication request from another module, controls the network OF 3-10, and controls communications with the external apparatus. Further, upon receiving a notification from the external apparatus, the NW control unit 3-54 notifies another module of the content of the notification.

A storage control unit 3-55 records and manages setting information and job information recorded in the storage 3-04. Each module in the hierarchy of the OS accesses the storage control unit 3-55 to refer to and set a setting value.

The virtual proxy unit 3-56 provides a communication environment (predetermined communication path) via a tunnel to the virtual machine 1-07.

A browser control unit 3-60 is one sub-module included in the OS 3-51, and performs control unique to a cloud browser, which will be described below. Any number of sub-modules included in the OS is applicable to the present exemplary embodiment.

A browser operation unit 3-62 has a function of, when receiving a notification of a user operation from the UI control unit 3-52, notifying a command OF 3-64 or a proxy processing unit 3-65 of the user operation content.

The proxy processing unit 3-65 receives the notification from the browser operation unit 3-62, and requests the storage control unit 3-55 to acquire proxy setting information. If a proxy setting is enabled based on the acquired proxy setting information, the proxy processing unit 3-65 sends a communication request to the proxy server 1-04 via the NW control unit 3-54. Further, the proxy processing unit 3-65 has a function of receiving a response to the communication request from the NW control unit 3-54 and notifying a browser display unit 3-63 or the command OF unit 3-64 of a result obtained by performing processing on the content of the response.

The command OF unit 3-64 receives the notifications from the browser operation unit 3-62 and the proxy processing unit 3-65, and requests communications with the image generation server 1-30 through the NW control unit 3-54. The communication request at this time includes the notified information in some cases. The notified information includes, for example, a user operation, such as text input, link pressing, scrolling, and zooming. For example, the text input may include a URL. The link pressing includes coordinates pressed on the operation unit 3-12. The user operation, such as scrolling and zooming, includes a character string associated with the operation. In addition, the NW control unit 3-54 receives communications from the image generation server 1-30. The NW control unit 3-54 performs processing on the received content and sends a notification to an image data acquisition unit 3-61 or the browser display unit 3-63.

The image data acquisition unit 3-61 receives the URL of the storage 2-02 in which a rendering result is stored, from the command OF unit 3-64. The image data acquisition unit 3-61 acquires an image from the URL and passes the image to the browser display unit 3-63.

The browser display unit 3-63 receives the image from the image data acquisition unit 3-61 and instructs the UI control unit 3-52 to draw the image. In addition, in response to a notification from the command I/F unit 3-64 and the proxy processing unit 3-65, the browser display unit 3-63 issues an instruction to draw a screen on which a message corresponding to the notification is displayed.

<Procedure of System Use>

A procedure of use of the cloud browser system 1-00 having the above-described configuration will be described. FIGS. 8A and 8B illustrate a use sequence for the cloud browser system.

FIGS. 8A and 8B illustrate exchanges between the user, the browser control unit 3-60, the virtual proxy unit 3-56, the proxy server 1-04, the virtual machine 1-07, the Web page server 1-05, and the local Web page server 1-09 when the cloud browser system 1-00 is used.

Figure 4:
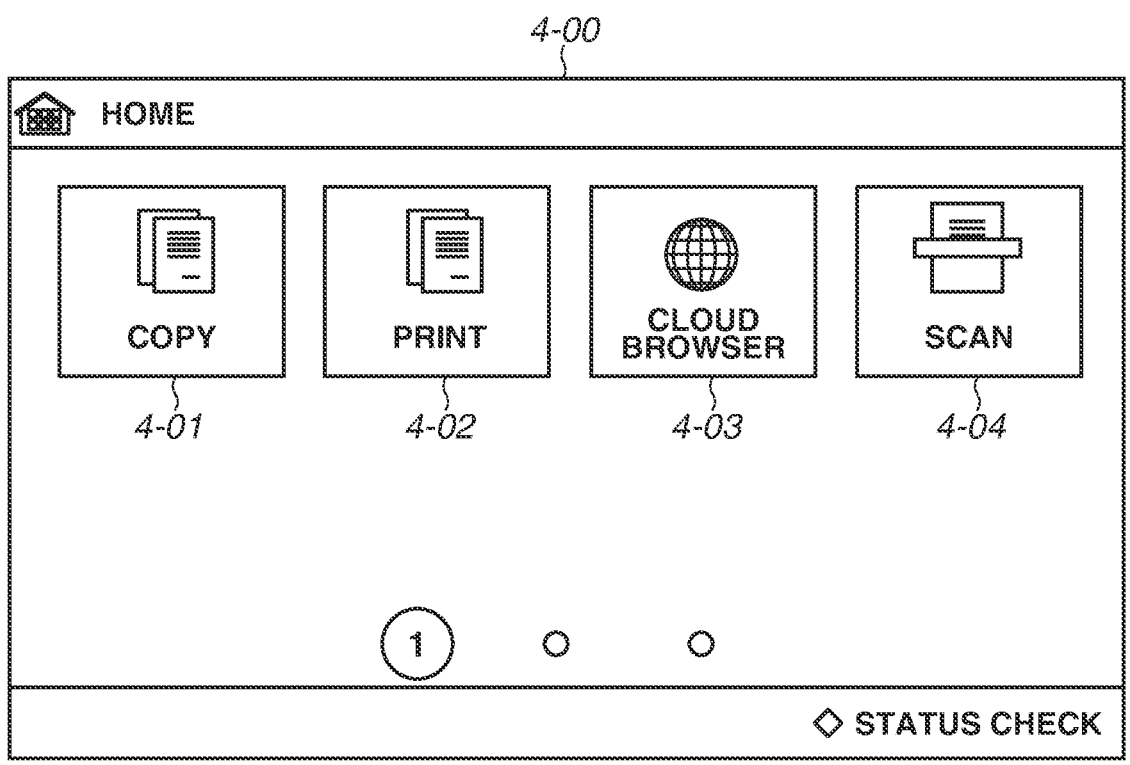
FIG. 4 illustrates an example of a home screen of the image forming apparatus.

When using the cloud browser system 1-00, the user operates the operation unit 3-12 of the image forming apparatus 1-01 to call a cloud browser function. FIG. 4 illustrates a menu screen displayed on the image forming apparatus 1-01. This screen is generated and displayed on the operation unit 3-12 by the CPU 3-01 running a program included in the UI control unit 3-52. A button 4-01 is a button related to a copy function. A button 4-02 is a button related to a print function. A button 4-03 is a button related to a cloud browser. A button 4-04 is a button related to a scan function. When any button is selected, the corresponding function is called. In step S8-010, when the button 4-03 is selected, the browser control unit 3-60 is activated, and a browser screen 5-00 is displayed on the operation unit 3-12.

The browser screen 5-00 includes a back button 5-01, a forward button 5-02, an address bar 5-03, and a settings button 5-04. Below them, a content area 5-05 for displaying a rendering result of Web content is provided. Their roles are the same as those of existing browsers.

Figure 5:
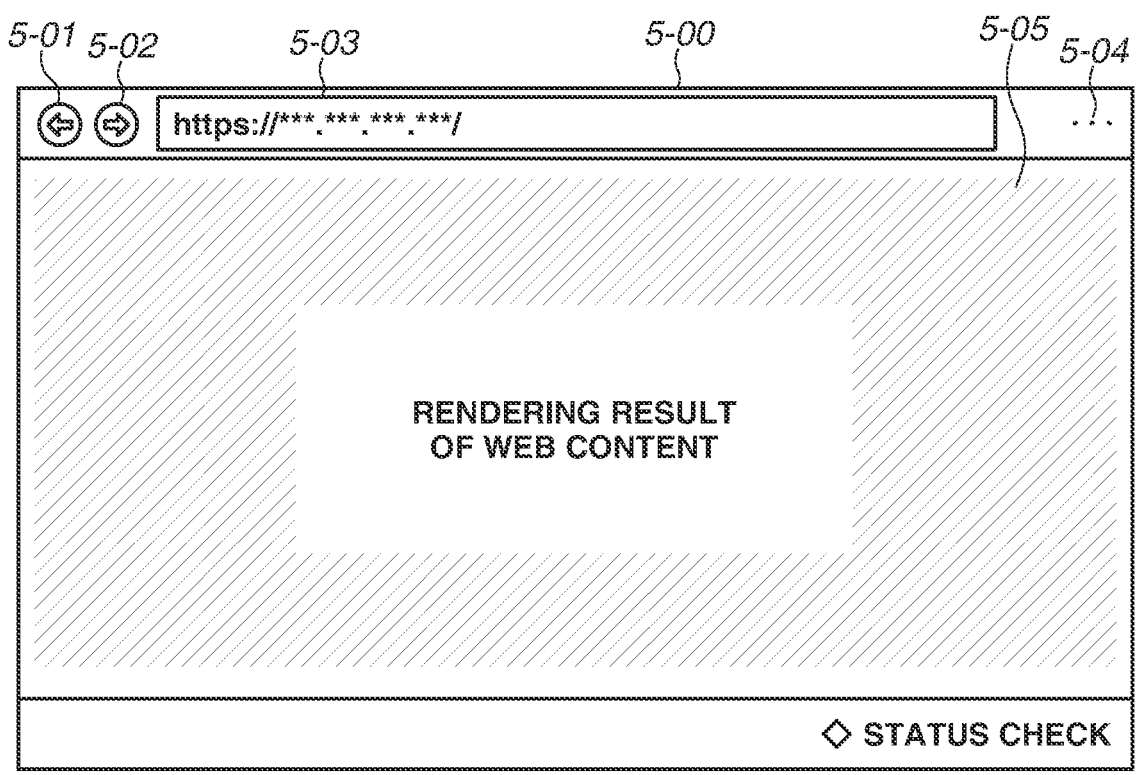
FIG. 5 illustrates the configuration of a cloud browser screen.

Nothing is displayed in the content area 5-05 until a URL is input after the browser control unit 3-60 is activated. Further, with a default URL registered in an item in the address bar 5-03 as with existing browsers, a result of rendering Web content of the URL may be displayed at the time of the activation. FIG. 5 illustrates an example in which a result of rendering some Web content acquired from a Web page indicated by the URL "https://*.*.*.*/" is displayed.

In steps S8-020 and S8-030, the browser control unit 3-60 accesses the virtual machine 1-07 via the proxy server 1-04, and requests creation of a tunnel between the image forming apparatus 1-01 and the virtual machine 1-07. The tunnel to be described below is created on this communication session. If no proxy is set, the image forming apparatus 1-01 communicates with the virtual machine 1-07 not via the proxy server 1-04.

Next, in step S8-025, the browser control unit 3-60 activates a virtual proxy function. Details of the virtual proxy function will be described below.

In step S8-040, the virtual machine 1-07 that has received the tunnel creation request (in step S8-030) performs server tunnel creation processing for creating the tunnel on the communication session. In step S8-045, on the other hand, the virtual proxy unit 3-56 performs device tunnel creation processing. Details of these pieces of tunnel creation processing will be described below with reference to FIG. 10.

These pieces of tunnel creation processing lead to determination of virtual proxy information. An example of the virtual proxy information is illustrated in FIG. 7B. The virtual proxy information includes a session identification (ID) 7-40, a proxy host 7-41, a proxy port 7-42, a proxy authentication ID 7-43, and a proxy authentication password 7-44 (password). The session ID 7-40 is an identifier for identifying a client that uses the virtual machine 1-07. The proxy host 7-41 and the proxy port 7-42 indicate information about a virtual proxy that makes access through the tunnel created by the above-described tunnel creation processing. The proxy authentication ID 7-43 and the proxy authentication password 7-44 indicate authentication information about the virtual proxy.

Next, in step S8-048, the virtual machine 1-07 starts the browser engine 2-51.

Next, the virtual machine 1-07 sets the virtual proxy information in the proxy setting unit 2-53 as setting information to be used for the browser engine 2-51 that has been started (S8-050). The host, port, proxy authentication ID, and password of the proxy are set as the settings of the browser engine 2-51 based on the above-described virtual proxy information.

A typical Web site includes link information about a plurality of pieces of Web content (such as CSS, JavaScript™, and images) in HTML. A browser follows these links to perform HTTP access and acquire the Web content. Further, the HTTP access may be dynamically performed depending on the loaded JavaScript. All these HTTP accesses are also performed in the browser engine 2-51. Thus, all of these HTTP accesses pass through the tunnel between the image forming apparatus 1-01 and the virtual machine 1-07 based on the setting in step S8-050.

In step S8-058, the virtual machine 1-07 notifies the session ID 7-40 determined in step S8-040 to the browser control unit 3-60. Next, in steps S8-060 and S8-070 the browser control unit 3-60 accesses the virtual machine 1-07 via the proxy server 1-04, notifies the URL of the Web content to be rendered, and requests rendering of the Web content.

Figure 7A:
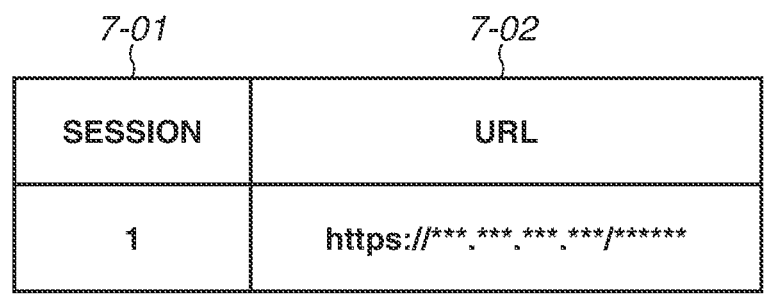
FIG. 7A illustrates an example of virtual proxy information managed by the virtual machine.
Figure 7B:
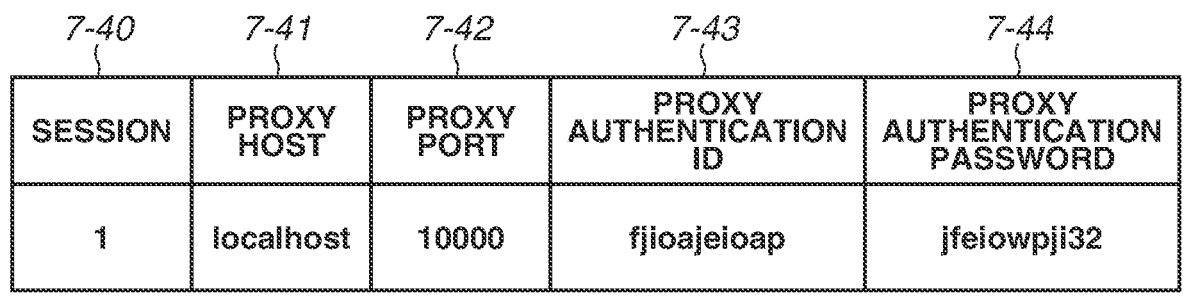
FIG. 7B illustrates an example of association management information between a session and a browser managed by the virtual machine.

As illustrated in FIG. 7A, the rendering request includes a session ID 7-01 and a Web content URL 7-02. The session ID 7-01 specifies the same identifier as the session ID 7-40 notified in step S8-058. In step S8-075, upon receiving the rendering request, the virtual machine 1-07 causes the browser engine 2-51 to acquire Web content of the Web content URL 7-02 included in the rendering request.

In step S8-080, the proxy setting unit 2-53 issues a Web content acquisition request for the Web content URL 7-02 to the proxy set in step S8-050. This Web content acquisition request is notified to the virtual proxy unit 3-56 through the tunnel created by the tunnel creation in steps S8-040 and S8-045. In step S8-085, the virtual proxy unit 3-56 that has received the Web content acquisition request (in step S8-080) performs proxy processing, which will be described in detail below with reference to FIG. 9. In steps S8-090 and S8-100, a content acquisition request is sent to the Web page server 1-05 specified by the URL in this proxy processing (in step S8-085). Also in this case, whether to perform communication via the proxy server 1-04 or to directly perform communication with the Web page server 1-05 is switched depending on the setting. In steps S8-110 and S8-120, the Web page server 1-05 that has received the content acquisition request (in step S8-100) returns the Web content of the specified URL.

In step S8-130, the virtual proxy unit 3-56 returns the received Web content to the virtual machine 1-07. In step S8-140, the virtual machine 1-07 renders the received Web content at the proxy setting unit 2-53 and stores the rendered image.

In steps S8-150 and S8-155, the virtual machine 1-07 returns a URL for access to the stored rendering image.

In steps S8-160 and S8-165, the browser control unit 3-60 issues an image acquisition request for the rendered image URL received in step S8-155.

In steps S8-170 and S8-175, the virtual machine 1-07 returns the image corresponding to the URL of the image acquisition request. In step S8-180, upon acquiring the rendered image, the browser control unit 3-60 displays the rendered image on the operation unit 3-12. In step S8-190, the user, after having finished the use, issues an end request to the browser control unit 3-60.

In steps S8-200 and S8-210, upon receiving the end request, the browser control unit 3-60 requests the virtual machine 1-07 to discard the tunnel. In other words, the tunnel discard request is issued when the browser function is terminated. In step S8-220, the virtual machine 1-07 that has received the discard request discards the tunnel and, in step S8-230, the virtual machine 1-07 ends the proxy setting unit 2-53.

The above-described operation allows the image forming apparatus 1-01 to operate as if the image forming apparatus 1-01 directly accesses the target Web page server, even though the image forming apparatus 1-01 and the image generation server 1-30 are on different networks. This allows communication via the proxy server 1-04, thereby guaranteeing security. Even if content is provided by the local Web page server 1-09 in a private network, such as the intranet 1-20, the virtual machine 1-07 can access, render, and provide the content to the image forming apparatus 1-01.

<Proxy Setting>

FIG. 6 illustrates a settings screen of the cloud browser system 1-00. This settings screen is provided as a Web page using the server function of the image forming apparatus 1-01, and the Web page can be seen from the external apparatus. For example, the user terminal 1-08 connected via the same network line can display a settings screen 6-00 by inputting a specific URL to the Web browser. Using this settings screen, processing in step S10-010 is performed. The settings screen 6-00 can be directly displayed on the operation unit 3-12 without being converted into the Web page information.

The settings screen 6-00 includes an item 6-01, an item 6-02, an item 6-03, an item 6-04, and an item 6-06.

The item 6-01 is a setting item for setting ON/OFF of use of the cloud browser function. When the check box of the item 6-01 is checked, the use of the cloud browser function is turned on, and the button 4-03 of the cloud browser is displayed on the settings screen 6-00. When the check box of the item 6-01 is unchecked, the use of the cloud browser function is turned off, and the button 4-03 of the cloud browser is deleted from the settings screen 6-00. Further, the item 6-01 is an item to be operated first on the settings screen 6-00, and with the check box of the item 6-01 checked, the other items can be operated.

The item 6-02 is a setting item for setting whether or not to use a proxy. In an environment in which the proxy is used for accessing the Internet, the check box of the setting item 6-02 is checked to set the host and port information about the proxy.

The item 6-03 is a setting item for setting authentication information about proxy authentication. In an environment in which authentication is required for use of the proxy, the check box of the item 6-03 is checked, and proxy authentication information (ID and password) is specified.

The item 6-04 is a setting item for setting a start-up URL. When the check box of the item 6-04 is checked and a URL is entered in the input field, the specified URL is automatically accessed when the cloud browser application is activated. The information set here is notified via the network OF 3-10 and recorded in the storage 3-04.

The item 6-06 is an item for specifying an HTTP header to be used when the image forming apparatus 1-01 issues an HTTP request to the image generation server 1-30. If this setting is enabled, a specified HTTP header (HTTP header for the proxy) is additionally set to an HTTP header to be used when the image forming apparatus 1-01 issues an HTTP request to the image generation server 1-30, and communication is performed. This makes it possible to determine which access destination out of the HTTP accesses through the proxy server 1-04 is an access to the image generation server 1-30. When the Web access is restricted by the proxy server 1-04, this configuration can be used in identification of which access is to be restricted, and the effect of appropriate access restriction can be expected.
<Control>

Figure 10:
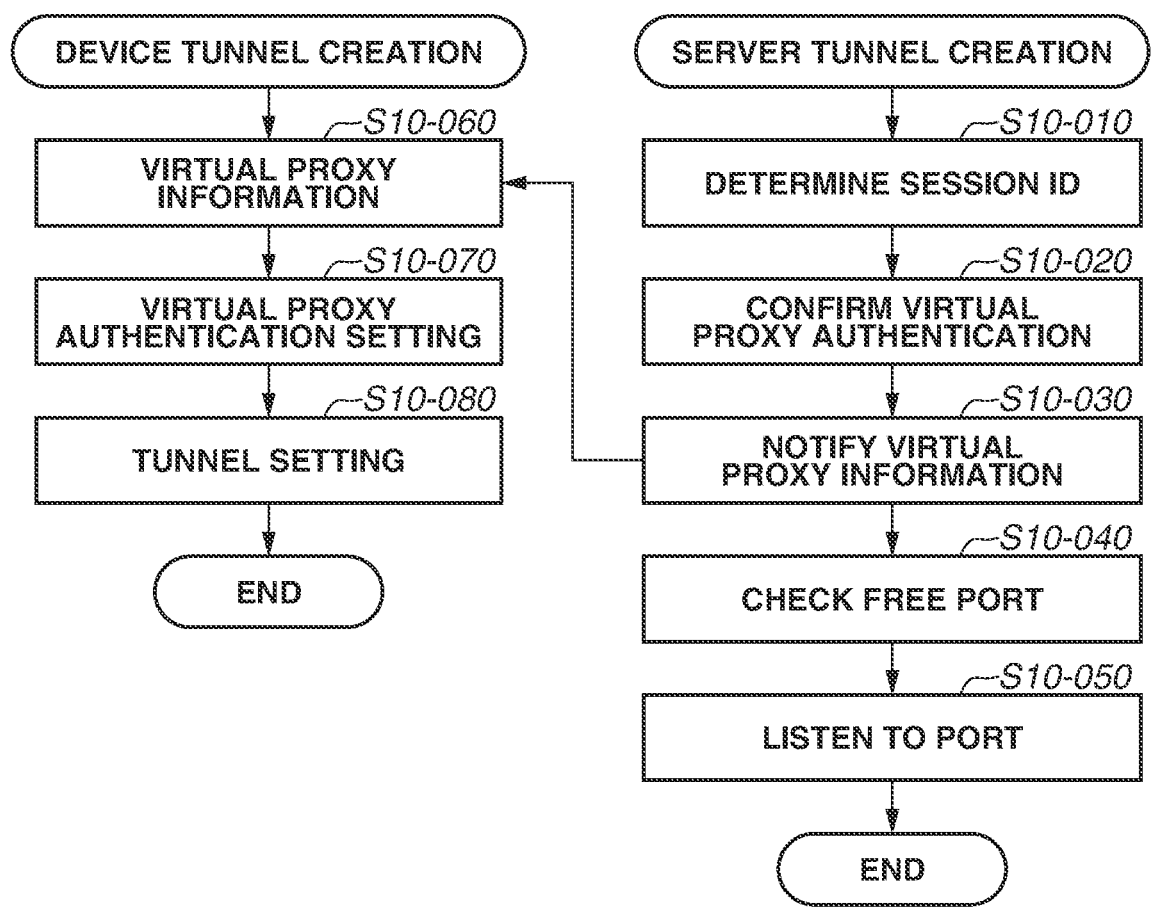
FIG. 10 is a flowchart illustrating processing for creating a tunnel between the image forming apparatus and the virtual machine.

FIG. 10 is a flowchart illustrating processing for creating the tunnel between the image forming apparatus 1-01 and the virtual machine 1-07. Details of the server tunnel creation (in step S8-040) and the device tunnel creation (in step S8-045) will be described with reference to FIG. 10. Of the pieces of processing illustrated in FIG. 10, the pieces of processing in the image forming apparatus 1-01 is performed by the controller unit 3-00. More specifically, the pieces of processing performed by the controller unit 3-00 is carried out by the CPU 3-01 running the program that is loaded into the RAM 3-02 from the ROM 3-03 or the storage 3-04 where a program has been stored. Of the pieces of processing illustrated in FIGS. 8A and 8B, the pieces of processing in the virtual machine 1-07 is performed by the CPU 2-01 running the program that is loaded into the RAM 2-03 from the storage 2-02 where a program has been stored.

In step S10-010, in the server tunnel creation (in step S8-040), the CPU 2-01 determines a session ID to manage the tunnel. The session ID determined here is managed in the session ID 7-40 as an item as illustrated in FIG. 7A. The session ID 7-40 may be in any format as long as it is unique information.

Next, in step S10-020, in order to confirm authentication information (ID and password) to be used by the virtual proxy unit 3-56, the CPU 2-01 performs virtual proxy authentication determination processing.

The authentication information (ID and password) is generated using, for example, a random character string or a hash function. The generated authentication information is managed in the proxy authentication ID 7-43 and the proxy authentication password 7-44 as items in association with the session ID 7-40. Next, the in step S10-030, the CPU 2-01 notifies the image forming apparatus 1-01 of the determined authentication information.

Next, the in step S10-040, the CPU 2-01 determines a port number to be used in communication with the virtual proxy unit 3-56. This port number is managed in the proxy port 7-42 as an item in association with the session ID 7-40.

Next, the in step S10-050, the CPU 2-01 listens to a transmission control protocol (TCP) port of the determined port number. When this port is accessed, this port is set to communicate with the virtual proxy unit 3-56. The above are the processing of the server tunnel creation (in step S8-040) in detail.

In step S10-060, on the other hand, in the device tunnel creation (in step S8-045), the CPU 3-01 receives the virtual proxy authentication information (ID and password).

Next, the in step S10-070, the CPU 3-01 sets this authentication information as the authentication information about the virtual proxy. Then, in step S10-080, the tunnel is created so that proxy access from the virtual machine 1-07 can be received by the virtual proxy unit 3-56.

As described above, the tunnel between the virtual machine 1-07 and the image forming apparatus 1-01 is created. In the present exemplary embodiment, the virtual machine 1-07 performs the virtual proxy authentication confirmation processing (in step S10-020), and the image forming apparatus 1-01 performs the virtual proxy information reception processing (in step S10-070). However, the roles of the virtual machine 1-07 and the image forming apparatus 1-01 may be reversed.

Next, the processing in step S8-085 will be described in detail. FIG. 9 is a flowchart illustrating proxy processing in the image forming apparatus. Each piece of the processing illustrated in this flowchart is performed by the controller unit 3-00. More specifically, each piece of the processing is carried out by the CPU 3-01 running the program that is loaded into the RAM 3-02 from the ROM 3-03 or the storage 3-04 where a program is stored.

The proxy processing (in step S8-085) is processing performed by the virtual proxy unit 3-56 at the time of receipt of the Web content acquisition request from the virtual machine 1-07.

In step S9-010, the CPU 3-01 verifies whether the proxy authentication information added to the Web content acquisition request and the proxy authentication information set in step S10-070 are correct. If it is verified that the proxy authentication information added to the Web content acquisition request and the proxy authentication information set in step S10-070 are correct (YES in step S9-010), the CPU 3-01 advances the processing to step S9-020. If it is not verified that the proxy authentication information added to the Web content acquisition request and the proxy authentication information set in step S10-070 are correct (NO in step S9-010), the CPU 3-01 advances the processing to step S9-070.

In step S9-020, the CPU 3-01 checks whether the URL of the Web content acquisition request is a URL (loop back address) indicating the Web content of the image forming apparatus 1-01. If the URL of the Web content acquisition request is the URL indicating the Web content of the image forming apparatus 1-01 (YES in step S9-020), the processing proceeds to step S9-060. Otherwise (NO in step S9-020), the processing proceeds to step S9-030.

In step S9-030, the CPU 3-01 checks whether or not proxy use setting is enabled. If proxy use is enabled (YES in step S9-030), the processing proceeds to step S9-050. If the proxy use is not enabled (NO in step S9-030), the processing proceeds to step S9-040.

In step S9-040, the CPU 3-01 performs processing of acquiring the content of the requested URL not via the proxy, and ends the processing.

In step S9-050, the CPU 3-01 transfers the Web content acquisition request to the set proxy and ends the processing.

In step S9-060, the CPU 3-01 acquires (downloads) the Web content provided by the image forming apparatus 1-01, and ends the processing.

In step S9-070, the CPU 3-01 returns an authentication error and ends the processing.

As described above, the Web content acquisition request from the virtual machine 1-07 can be appropriately processed.
<Remarks>

As described above, according to the present exemplary embodiment, even when the image forming apparatus 1-01 and the image generation server 1-30 exist in different networks, the image forming apparatus 1-01 can operate as if the image forming apparatus 1-01 directly accesses a target Web page server. This allows communication via the proxy server 1-04, thereby guaranteeing security. Further, even content provided by the local Web page server 1-09 in a private network, such as the intranet 1-20, can be accessed, rendered, and provided to the image forming apparatus 1-01 by the virtual machine 1-07.

A second exemplary embodiment will be described. In the first exemplary embodiment, the example has been described in which one image forming apparatus is tunnel-connected to the virtual machine 1-07 as one virtual machine. However, in terms of the characteristics of the action of Web browsing, it is unlikely that a situation will occur in which one image forming apparatus constantly issues a rendering request to one virtual machine and exclusively utilizes the resources of the virtual machine. In view of the consideration, in the present exemplary embodiment, an example will be described in which a plurality of image forming apparatuses are tunnel-connected to one virtual machine.

<Cloud Browser System>

Figure 12:
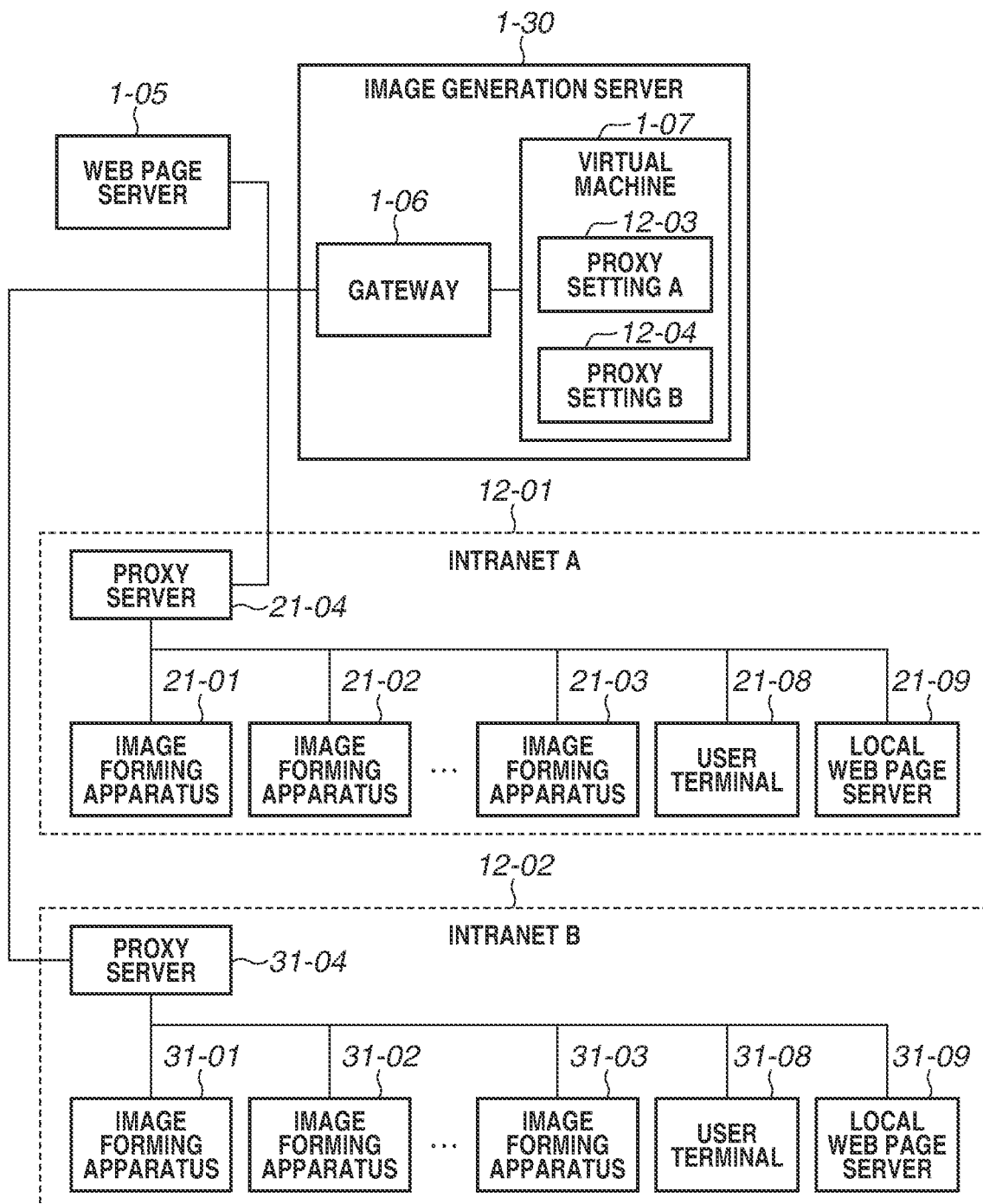
FIG. 12 is a block diagram illustrating a configuration example of a cloud browser system in which image forming apparatuses in a plurality of networks can access one virtual machine.

FIG. 12 is a block diagram illustrating a configuration example of a cloud browser system 12-00 in which image forming apparatuses in a plurality of networks can access one virtual machine.

In the cloud browser system 12-00, the Web page server 1-05 and the image generation server 1-30 are accessed from a plurality of intranets (intranet A 12-01 and intranet B 12-02).

In the intranet A 12-01, a proxy server 21-04, image forming apparatuses 21-01 to 21-03, a user terminal 21-08, and a local Web page server 21-09 are disposed. The proxy server 21-04 has a configuration corresponding to the proxy server 1-04. However, the proxy server 21-04 according to the present exemplary embodiment is disposed in the intranet A 12-01. The image forming apparatuses 21-01 to 21-03 have configurations each corresponding to the corresponding image forming apparatus of the image forming apparatuses 1-01 to 1-03. The user terminal 21-08 has a configuration corresponding to the user terminal 1-08. The local Web page server 21-09 corresponds to the local Web page server 1-09.

In the intranet B 12-02, a proxy server 31-04, image forming apparatuses 31-01 to 31-03, a user terminal 31-08, and a local Web page server 31-09 are disposed. The proxy server 31-04 has a configuration corresponding to the proxy server 1-04. However, the proxy server 31-04 according to the present exemplary embodiment is arranged in the intranet B 12-02. The image forming apparatuses 31-01 to 31-03 have configurations each corresponding to the corresponding image forming apparatus of the image forming apparatuses 1-01 to 1-03. The user terminal 31-08 has a configuration corresponding to the user terminal 1-08. The local Web page server 31-09 corresponds to the local Web page server 1-09.

In a normal case, the units in the intranet A 12-01 can access the local Web page server 21-09, but no unit outside the intranet A 12-01 can access the local Web page server 21-09. For example, the image forming apparatus 21-01 can access the local Web page server 21-09, but the image forming apparatus 31-01 and the virtual machine 1-07 cannot access the local Web page server 21-09.

Similarly, in a normal case, the units in the intranet B 12-02 can access the local Web page server 31-09, but no unit outside the intranet B 12-02 can access the local Web page server 31-09. For example, the image forming apparatus 31-01 can access the local Web page server 31-09, but the image forming apparatus 21-01 and the virtual machine 1-07 cannot access the local Web page server 31-09.

The virtual machine 1-07 according to the present exemplary embodiment is configured to be able to simultaneously hold a proxy setting A 12-03 and a proxy setting B 12-04. The proxy setting A 12-03 is, for example, setting information for establishment of a tunnel connection with the image forming apparatus 21-01, and the proxy setting B 12-04 is, for example, setting information for establishment of a tunnel connection with the image forming apparatus 31-01. Thus, the virtual machine 1-07 is tunnel-connected in parallel to each unit in different networks. This allows the virtual machine 1-07 to sequentially receive rendering requests around the same time.

<Difference>

The procedure of use of the system in the present exemplary embodiment is substantially the same as that described with reference to FIGS. 8A and 8B in the first exemplary embodiment. However, a browser is to be activated for an image forming apparatus to be connected, and the browser varies between the image forming apparatuses to be connected. Control for each browser is, therefore, performed in step S8-048. The control for each browser is managed using a session ID. FIG. 13B illustrates an example of association management information between sessions and browsers managed by the virtual machine 1-07. As illustrated in FIG. 13B, a session ID column 13-70 and a browser column 13-71 are used to manage the association between the session IDs and the browsers. The "session 2" is, for example, a session ID corresponding to a browser for the image forming apparatus 21-01, and the "session 3" is, for example, a session ID corresponding to a browser for the image forming apparatus 31-01. In this manner, a session ID is determined in step S10-010 so that a unique session ID can be used for each connection destination.

Because the browsers for the respective session IDs are in a one-to-one correspondence with the image forming apparatuses, virtual proxy information to be used for the browsers is also different from each other. FIG. 13A illustrates an example of virtual proxy information managed by the virtual machine 1-07. In the present exemplary embodiment, a port is assigned to each virtual proxy, thereby distinguishing the image forming apparatus to be tunnel-connected from the other image forming apparatuses. As illustrated in a proxy port column 13-42, a port to be used varies between the session IDs. For example, a "proxy port 10001" is a port for establishing a tunnel connection with the image forming apparatus 21-01, and a "proxy port 10002" is a port for establishing a tunnel connection with the image forming apparatus 31-01. Thus, the processing in steps S10-020, S10-030, and S10-040 is performed so that the virtual proxy information and the port for each connection destination can be used.

<Remarks>

As described above, in the present exemplary embodiment, even when the image generation server 1-30 is on a network different from that of the image forming apparatus 21-01 or the image forming apparatus 31-01, the image generation server 1-30 can operate as if the image forming apparatus 21-01 or the image forming apparatus 31-01 directly accesses a target Web page server. This allows communication via the proxy server 21-04 and the proxy server 31-04, which are respective proxy servers, thereby individually guaranteeing security. Further, this makes it possible to create a use environment in which Web content provided by the local Web page server 21-09 in the intranet A 12-01 is provided to the image forming apparatus 21-01 but not to the image forming apparatus 31-01.

Other Embodiments

The present disclosure is not limited to the above-described exemplary embodiments, and various modifications (including any combination of the exemplary embodiments) can be made based on the gist of the present disclosure that are not excluded from the scope of the present invention.

Figure 11A:
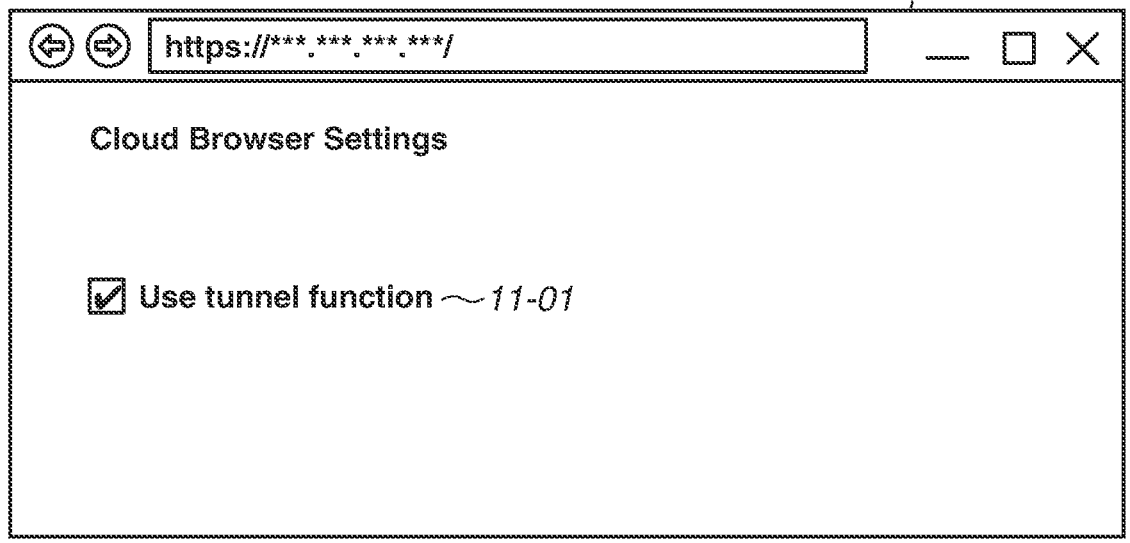
FIG. 11A illustrates a settings screen of a cloud browser according to another exemplary embodiment.
Figure 11B:
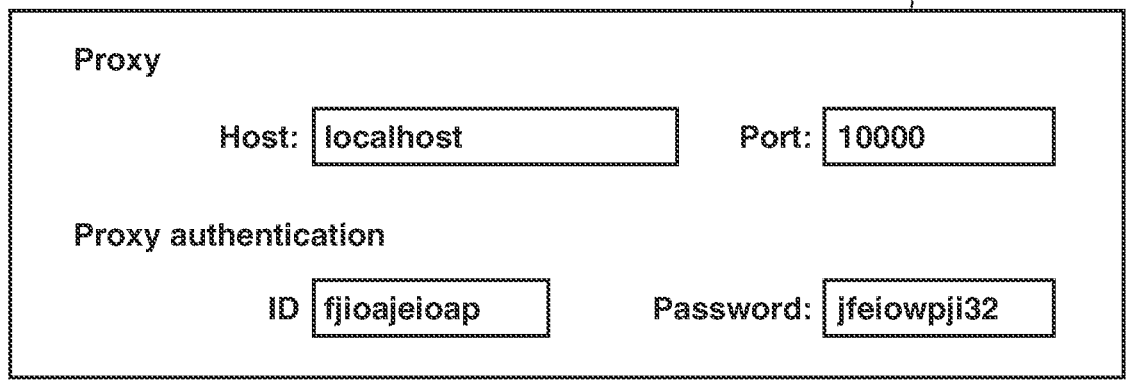
FIG. 11B illustrates a settings screen of a virtual machine according to the other exemplary embodiment.

The exemplary embodiments have been described based on the assumption that the tunnel function is used when a cloud browser system is used. However, the use of the tunnel function can be switched between ON and OFF with a setting. FIG. 11A illustrates a settings screen of a cloud browser according to another exemplary embodiment. The settings screen includes an item 11-01. The item 11-01 is an item for setting whether to create a tunnel between the image forming apparatus 1-01 and the virtual machine 1-07. When the item 11-01 is enabled, the operation is performed as in the sequence of FIGS. 8A and 8B. Thus, when the virtual machine 1-07 attempts to access the Web page server 1-05, communication via the proxy server 1-04, which is normally inaccessible, can be performed by using the tunnel. Further, using the tunnel allows access to the local Web page server 1-09, which cannot be accessed normally. When the item 11-01 is enabled, the processing in steps S8-020 and S8-025 is not performed. Thus, a tunnel is not created between the image forming apparatus 1-01 and the virtual machine 1-07, and the virtual machine 1-07 directly accesses the Web page server 1-05 to acquire Web content.

In the exemplary embodiments, the example has been described in which proxy authentication for the tunnel function is automatically performed without a user operation. However, a manual setting method involving a user operation can be employed for the proxy authentication for the tunnel function. For example, the image forming apparatus 1-01 generates an ID and a password and displays the ID and the password on a settings (Cloud Browser Settings) screen 11-00. The user notes this information and inputs the information to a settings screen 11-50 of the virtual machine 1-07. This method enables exchanging the authentication information about the proxy for creating the tunnel.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

The present disclosure can be applied to a system composed of a plurality of devices or an apparatus composed of a single device. For example, parts of the functions of the above described embodiments can be implemented by an external server, and by acquiring a result processed by the external server, the overall function can be implemented.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2022-126366, filed Aug. 8, 2022, which is hereby incorporated by reference herein in its entirety.

What is claimed is:

1. A Web browsing system comprising an image generation server, a first communication terminal and a second communication terminal,
    wherein the first communication terminal communicates with the image generation server via a first proxy server and includes a first virtual proxy for the image generation server,
    wherein the second communication terminal communicates with the image generation server via a second proxy server and includes a second virtual proxy for the image generation server, and
    wherein the image generation server comprises:
        one or more memories that store instructions; and
        one or more processor that execute the instructions to:
            set setting information of the first virtual proxy in association with a first port number and a first session ID corresponding to a first session for the first communication terminal;
            set setting information of the second virtual proxy in association with a second port number and a second session ID corresponding to a second session for the second communication terminal;
            create, when receiving a request from the first communication terminal via the first proxy server, a communication path as the first session between the first communication terminal and the image generation server;
            receive, using the communication path as the first session, a first Web content from a Web server via the first virtual proxy;
            render the first Web content to obtain a first rendering image;
            provide the first communication terminal with the obtained first rendering image via the first proxy server;
            create, when receiving another request from the second communication terminal via the second proxy server, a communication path as the second session between the second communication terminal and the image generation server;
            receive, using the communication path as the second session, a second Web content from the Web server via the second virtual proxy;
            render the second Web content to obtain a second rendering image; and
            provide the second communication terminal with the obtained second rendering image via the second proxy server.

2. The Web browsing system according to claim 1, wherein, if the first communication terminal requests the image generation server to render a Web content specified with a loopback address, the first virtual proxy of the first communication terminal transmits the Web content provided by the first communication terminal corresponding to the loopback address to the image generation server via the communication path as the first session.

3. The Web browsing system according to claim 1, wherein the first-communication path as the first session is created when a browser function of the first communication terminal is activated, and is discarded when the browser function of the first communication terminal is terminated, and wherein the communication path as the second session is created when a browser function of the second communication terminal is activated, and is discarded when the browser function of the second communication terminal is terminated.

4. The Web browsing system according to claim 1, wherein the setting information of the first virtual proxy and the second virtual proxy includes an authentication ID and a password.

5. The Web browsing system according to claim 4, wherein the authentication ID and the password are determined by the image generation server.

6. The Web browsing system according to claim 1, wherein the first communication terminal includes a printer configured to form an image on a sheet.

7. The Web browsing system according to claim 1, wherein the first communication terminal includes a scanner configured to read an image from a document.

* * * * *